(12) United States Patent
Seta et al.

(10) Patent No.: US 6,824,374 B1
(45) Date of Patent: Nov. 30, 2004

(54) THERMOPLASTIC RESIN INJECTION MOLDING MACHINE

(75) Inventors: Kunihito Seta, Shiga-ken (JP); Takeshi Takeda, Shiga-ken (JP)

(73) Assignee: Murata Manufacturing Co., Ltd., Nagaokakyo (JP)

(*) Notice: Subject to any disclaimer, the term of this patent is extended or adjusted under 35 U.S.C. 154(b) by 0 days.

(21) Appl. No.: 09/470,967

(22) Filed: Dec. 23, 1999

(30) Foreign Application Priority Data

Dec. 25, 1998 (JP) ............................. 10-369925
Dec. 2, 1999 (JP) ............................. 11-342740

(51) Int. Cl.[7] ............................................. B29C 45/77
(52) U.S. Cl. .................... 425/145; 425/558; 425/560; 425/587
(58) Field of Search ............................. 425/135, 145, 425/558, 560, 563, 587

(56) References Cited

U.S. PATENT DOCUMENTS

| | | | |
|---|---|---|---|
| 3,080,610 A | | 3/1963 | Baigent |
| 3,317,962 A | * | 5/1967 | Morse .......................... 366/78 |
| 3,611,503 A | * | 10/1971 | Blumer ........................ 425/147 |
| 3,674,401 A | * | 7/1972 | Annis, Jr. et al. ............ 425/567 |
| 5,002,717 A | * | 3/1991 | Taniguchi ................ 264/328.1 |
| 5,028,373 A | * | 7/1991 | Taniguchi et al. ....... 264/328.1 |
| 5,098,267 A | * | 3/1992 | Cheng ......................... 425/4 R |
| 5,389,315 A | * | 2/1995 | Yabushita .................. 264/40.1 |
| 5,773,042 A | * | 6/1998 | Amano et al. ............... 425/207 |
| 5,925,295 A | * | 7/1999 | Nakamura et al. ..... 264/328.19 |
| 6,042,760 A | * | 3/2000 | Nakazawa et al. ....... 264/328.1 |
| 6,109,909 A | * | 8/2000 | Morita ........................ 425/557 |

FOREIGN PATENT DOCUMENTS

| | | |
|---|---|---|
| DE | 114 22 29 | 1/1963 |
| DE | 43 31 207 | 3/1995 |
| DE | 197 03 628 | 10/1997 |
| DE | 197 18 174 | 11/1997 |
| DE | 197 15 229 | 10/1998 |
| DE | 198 49 797 | 5/1999 |
| FR | 1 298 834 | 7/1962 |
| FR | 1 364 095 | 6/1964 |
| FR | 1 553 319 | 12/1968 |
| JP | 57-87340 | 5/1982 |
| JP | 3-36426 | 4/1991 |
| JP | 4-7180 | 1/1992 |
| JP | 4-95329 | 3/1992 |
| JP | 5-131509 | 5/1993 |
| JP | 9-207180 | 8/1997 |
| WO | 97/11829 | 4/1997 |

OTHER PUBLICATIONS

Computer translation of Jap. Pub. No. 05–131509.*

* cited by examiner

*Primary Examiner*—James P. Mackey
*Assistant Examiner*—Donald Heckenberg
(74) *Attorney, Agent, or Firm*—Burns, Doane, Swecker & Mathis, L.L.P.

(57) ABSTRACT

An injection molding machine includes a plasticating unit for plasticating a thermoplastic resin, and an injecting unit connected to the plasticating unit through a connecting passage to inject the plasticated resin into a mold. In the connecting passage, provided is a buffering unit for reserving the resin in an amount at least equal to the quantity of the resin injected per one shot. The plasticated resin is temporarily reserved in the buffering unit, and then, the reserved resin is fed to the injecting unit when the measuring is carried out, whereby the plasticating unit can be driven continuously simultaneously with the operation of the injecting unit and the mold. The molding cycle can shortened with the plastication efficiency being enhanced.

19 Claims, 9 Drawing Sheets

THERMOPLASTIC RESIN INJECTION MOLDING MACHINE

BACKGROUND OF THE INVENTION

1. Field of the Invention

The present invention relates to a thermoplastic resin injection molding machine, and more particularly to a thermoplastic resin injection molding machine including a plasticating unit and an injecting unit provided independently of each other.

2. Description of the Related Art

As a conventional injection molding machine including a plasticating unit for plasticating a thermoplastic resin, and an injecting unit for injecting the plasticated resin into a mold, provided independently of each other, known is a screw preplasticating injection molding machine. In the front of the injecting plunger of the injecting unit, formed is a chamber, what is called a reservoir, for reserving a resin in an amount equal to the injection quantity of the resin per shot. To the chamber, the resin plasticated in the plasticating unit is supplied, and injected into the mold by moving the injecting plunger forward.

In such a conventional injection molding machine, the molding cycle comprises the processes of injection, dwelling, cooling, mold opening and closing, which are repeated in that order, as understood in the molding cycle of a conventional injection molding machine shown in FIG. 1. During the processes of injection, dwelling, and mold opening and closing, the plasticating unit is stopped. Simultaneously at the time when the cooling process is started, the screw of the plasticating unit is driven to plasticate the resin and feed the plasticated resin to the reservoir (measured).

Margin means a spare time till the opening and closing of the mold is started after the cooling, and is provided to stabilize the molding cycle. The period of the margin is changed depending on the injection amount of a resin per shot.

As described above, in the conventional injection molding, the plasticating process is carried out synchronously with the measuring process in the injecting unit and intermittently during a series of the processes constituting the molding cycle. As regards a resin such as LCP (liquid crystal polymer) which has low screw-engaging properties, the plastication does not start soon after the screw starts. Therefore, the plastication efficiency of the intermittent driving is very low. As a result, for the plastication, a long period of time is required. This brings about the prolongation of the molding cycle.

SUMMARY OF THE INVENTION

Accordingly, it is an object of the present invention to provide a thermoplastic resin injection molding machine of which the plastication efficiency of a resin can be enhanced, and the molding cycle can be shortened.

The above-described object can be achieved according to the present invention. According to a first aspect of the present invention, there is provided an injection molding machine which comprises a plasticating unit for plasticating a thermoplastic resin, an injecting unit connected to the plasticating unit through a connecting passage to inject the plasticated resin into a mold, and a buffering unit provided in the connecting passage to reserve the resin plasticated in the plasticating unit in an amount at least equal to the injection quantity of the resin per shot and feed the resin into the injecting unit.

According to a second aspect of the present invention, there is provided a thermoplastic resin injection molding machine which comprises a plasticating unit for plasticating a thermoplastic resin, and an injecting unit connected to the plasticating unit through a connecting passage to inject the plasticated resin into a mold, the plasticating unit comprising a cylinder, a screw rotatable and movable in the axial direction in the cylinder, means for rotation-driving the screw, a buffering chamber defined by the top portion of the screw and the cylinder to reserve the plasticated resin in an amount at least equal to the injection quantity of the resin per shot, and means of energizing the screw forward in the axial direction to feed the resin in the buffering chamber into the injecting unit.

The resin plasticated in the plasticating unit is fed to the injecting unit through the connecting passage. However, while the injection and the dwelling are carried out, the resin can not be fed. According to the first aspect of the present invention, the buffering unit is provided in the connecting passage connecting the plasticating and injecting units to each other. The plasticated resin is temporarily reserved in the buffering unit. Then, when the measuring is carried out, the reserved resin is fed into the injecting unit. As seen in the embodiment of the present invention of FIG. 1, the plasticating unit can be continuously driven independently of the movement of the respective parts of the molding cycle. Therefore, even for a resin having low engaging-properties such as LCP or the like, the plasticating efficiency can be enhanced. As a result, the molding cycle can be significantly reduced as compared with the conventional injection molding machine.

For the purpose of enhancing the production efficiency of injection molding, there are available two methods. In one method, the number of molding products per shot is increased, and in the other, the molding cycle is shortened. In the conventional molding, the shortening of the molding cycle has a limitation. Accordingly, it has been dominant that the number of molding products per shot is increased, that is, large-size molds are used for the enhancement of the production efficiency. However, this method has the problem that since the depreciation expense of the mold is high, the unit cost of the products becomes high especially in the production of a variety of products in small lots which has been increasingly employed in recent years.

On the other hand, in the case that an injection molding machine having a shortened molding cycle such as the injection molding machine of the present invention is employed, such a high production efficiency as comparable to that of a large-size mold can be secured for even a small-size mold. Accordingly, as compared with the conventional production system, significant cost-saving can be achieved with respect to mold depreciation expenses. Further, since the small-size mold of which the number of molding products per shot is small is employed, the required mold clamping force is decreased. As a result, advantageously, the mold clamping mechanism and the molding machine itself can be reduced in size, and moreover, the molding machine itself can be formed inexpensively.

In the thermoplastic resin injection molding machine according to the first aspect of the present invention, preferably, the buffering unit comprises a pot for reserving a plasticated resin, a plunger disposed in the pot so that it can be moved forward and backward in the pot, and means for energizing the plunger in the resin extrusion direction. The resin pressure in the pot can be controlled by use of the energizing force of the energizing means.

According to the first aspect of the present invention, the buffering unit is provided in the connecting passage. On the other hand, according to the second aspect of the present invention, the buffering unit is contained in the plasticating unit. That is, the buffering unit is contained in the unit for plasticating a thermoplastic resin. In particular, the injection molding machine comprises a plasticating unit for plasticating a thermoplastic resin, and an injecting unit connected to the plasticating unit through a connecting passage to inject the plasticated resin into a mold, the plasticating unit comprising a cylinder, a screw rotatable and movable in the axial direction in the cylinder, means for rotation-driving the screw, a buffering chamber defined by the top portion of the screw and the cylinder to reserve the plasticated resin in an amount at least equal to the injection quantity of the resin per shot, and means of energizing the screw forward in the axial direction to feed the resin in the buffering chamber into the injecting unit.

In this case, in addition to the advantages of the injection molding machine according to the first aspect of the present invention, the machine can be reduced in size, since the buffering unit can be integrated with the plasticating unit, and also, the deterioration of the resin is inhibited, since the resin earlier plasticated is fed earlier to the injecting unit, that is, in the order of plastication, without the plasticated resin being retained in the buffering chamber.

As the energizing means, a spring may be employed. Also, a fluid-pressure cylinder (pneumatic or hydraulic) may be used. Furthermore, an electric actuator is available.

When the spring is employed, the buffering unit can be simplified, and moreover, the reserving and feeding operation of the buffering unit can be automatically carried out without additional control being necessitated.

When the fluid-pressure cylinder is used, the resin extruding force of the plunger or screw can be desirably controlled. In addition, in the measuring process, the measuring period can be shortened by operating the fluid-pressure cylinder rapidly to feed the resin into the injecting unit at a high speed.

When the electric actuator is used, the resin extruding force can be desirably controlled, and moreover, the movement variable of the plunger or screw can be controlled at a high precision. As the electric actuator, a linear motor, a combination of a motor and a ball screw mechanism, or the like may be employed.

When the fluid-pressure cylinder is used as the energizing means, preferably, a constant fluid pressure from a fluid-pressure source is transmitted to the fluid-pressure cylinder. Thereby, the extruding force for the resin extruded from the buffering unit can be made constant without additional adjustment being necessitated. That is, the resin pressure in the reservoir can be made constant. As a result, dispersions in qualities of molding products can be inhibited.

Preferably, the injection molding machine further comprises a pressure sensor for detecting a resin pressure in the pot, and resin-pressure controlling means for controlling the energizing means correspondingly to the value detected by the pressure sensor so that the resin pressure is kept substantially constant. In this case, the extruding pressure for the resin to be extruded from the buffering unit can be made constant by feedback-controlling the fluid-pressure cylinder or electric actuator correspondingly to the value detected by the pressure sensor.

Also preferably, the injection molding machine further comprises a position detecting sensor for detecting a displacement of the plunger, and plastication-controlling means for controlling the plasticating unit correspondingly to the displacement. In this case, the amount of the resin reserved in the pot is calculated based on the value detected by the position detecting sensor, and the plasticating unit can be controlled so that the amount of the resin is prevented from exceeding the upper limit of the amount of the resin capable of being reserved in the pot.

Preferably, the structure of the injection molding machine further comprising the pressure sensor and the resin-pressure controlling means is applied to the injection molding machine according to the second aspect of the present invention. Furthermore, the structure of the injection molding machine further comprising the position detecting sensor and the plastication-controlling means is applied to the injection molding machine according to the second aspect of the present invention. In these cases, the same operation and advantages as those of the above-described structures can be attained, respectively.

The plasticating unit can be driven by an arbitrary driving system. However, according to the present invention, it is preferable that the plasticating unit carries out the plastication of the resin continuously during all the period of the molding cycle. Thereby, even a resin having low engaging-properties such as LCP can be efficiently plasticated. In this case, the plasticating unit is continuously driven, while the injecting unit is done intermittently. Accordingly, a pulsation is generated between them. However, since the pulsation is absorbed by the buffering unit, injection can be carried out with high stability.

DESCRIPTION OF THE PREFERRED EMBODIMENT

Figure 2:
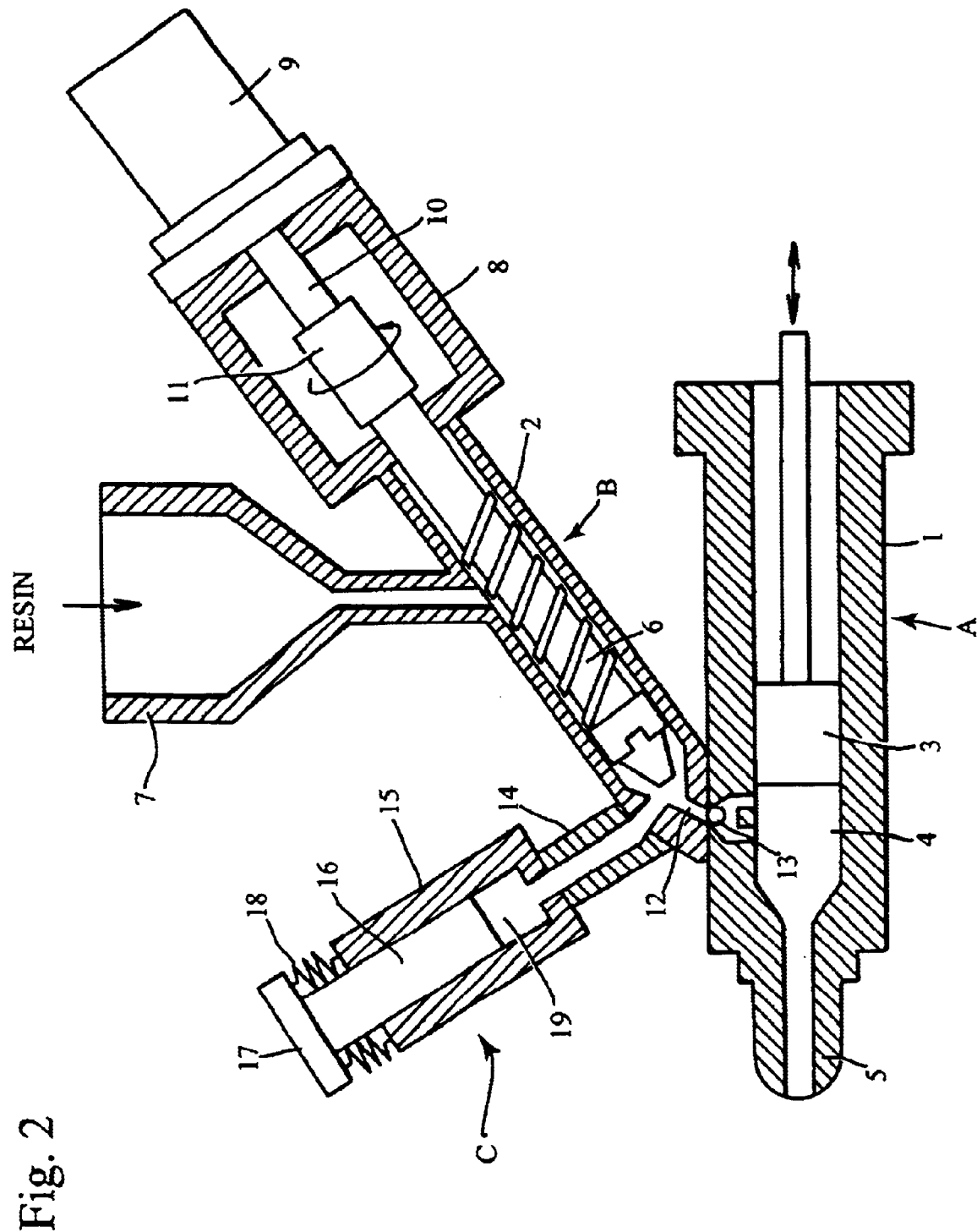
FIG. 2 is a cross section of an injection molding machine according to a first embodiment of the present invention.

FIG. 2 shows a screw preplasticating injection molding machine according to a first embodiment of the present invention. An injecting cylinder 1 is a component of an injecting unit A, and a plasticating cylinder 2 is that of a plasticating unit B. The plasticating cylinder 2 is connected to the upper side of the injecting cylinder 1. These cylinders 1 and 2 are heated at a predetermined resin melting temperature with a heater (not illustrated).

Inside of the injecting cylinder 1, an injecting plunger 3 is disposed movably in the axial direction. A reservoir 4 for reserving an amount of a resin equal to the injection quantity of the resin per one shot is provided between the top of the plunger 3 and the cylinder 1. In the rear of the injecting cylinder 1, provided is a publicly-known injection-driving unit (not illustrated) for reciprocating the injecting plunger 3 to and fro. A nozzle 5 fittable onto the sprue bush (not illustrated) of the mold is provided at the top of the injecting cylinder 1.

A rotatable plasticating screw 6 is equipped inside of the plasticating cylinder 2. A hopper 7 is connected to the upper side of the plasticating cylinder 2. A resin material is supplied into the cylinder 2 through the hopper 7 and melted, and simultaneously kneaded with the screw 6. In the rear of the plasticating cylinder 2, a sleeve 8 is provided, and a screw-driving motor 9 is fixed to the back side of sleeve 8. The rotary shaft 10 of the motor 9 is connected to the plasticating screw 6 through a joint 11.

The reservoir 4 of the injecting cylinder 1 and the inside of the plasticating cylinder 2 are communicated with each other through a connecting passage 12. In the portion of the connecting passage 12 facing the reservoir 4, provided is a check valve 13 for preventing the resin in the reservoir 4 from flowing backward into the plasticating cylinder 2. In this embodiment, the check valve 13 is employed. However, a switching valve for switching two positions at one of which the connecting passage 12 and the reservoir 4 are in the communication state, and at the other of which the reservoir 4 and the nozzle 5 are in the communication state may be employed.

A buffering unit C is provided on the way of the connecting passage 12 at a position thereof nearer to the plasticating cylinder 2 than the check valve 13. The buffering unit C comprises a pot 15 connected to the plasticating cylinder 2 through a connecting pipe 14, a plunger 16 reciprocatably inserted into the pot 15, and a spring 18 provided between the pot 15 and a flange 17 on the back of the plunger 16 to energize the plunger 16 forward (in the direction where a resin is extruded). The buffering unit C is also heated at a predetermined temperature to keep a resin in the melted state, together with the injecting unit A and the plasticating unit B. Between the pot 15 and the top of the plunger 16, provided is a buffering chamber 19 of which the volume is at least equal to the injection quantity per shot of the injecting unit A.

Hereinafter, the operation of the injection molding machine having the above-described structure will be described.

First, the screw 6 is continuously rotated by means of the motor 9. A resin material supplied through the hopper 7 is extruded forward along the spiral of the screw 6 while it is being melted. During the injection and dwelling processes, the check valve 13 is closed, so that the resin plasticated in the plasticating unit B can not be fed to the injecting unit A. Accordingly, the resin is fed to the buffering unit C and reserved there.

After the dwelling is completed, the measuring process is started. In the measuring process, the injecting plunger 3 is moved backward with the pressure in the reservoir 4 being reduced, so that the check valve 13 is opened, and the resin reserved in the buffering chamber 19 is fed into the reservoir 4 through the connecting passage 12 with the spring force of the spring 18 being applied. Thereby, the resin in an amount equivalent to the injection quantity per shot is placed in the reservoir 4.

Simultaneously with the measuring process, the mold cooling process is carried out. Successively, the opening and closing of the mold is conducted. After the opening and closing of the mold is completed, the injecting plunger 3 is driven forward, so that the resin is injected into the mold through the nozzle 5 (see the molding cycle of the injection molding machine of the present invention illustrated in FIG. 1).

As described above, the plastication is continuously carried out during a series of the processes of injection, dwelling, cooling (measuring), and mold opening and closing constituting the molding cycle. In particular, the injecting unit A is intermittently driven, while the plasticating unit B is continuously driven. As a result, the resin pressure in the connecting passage 12 connecting the plasticating unit B and the injecting unit A to each other is significantly pulsated. However, since the pulsation is absorbed by the buffering unit C, the injection molding can be carried out with high stability.

Figure 3:
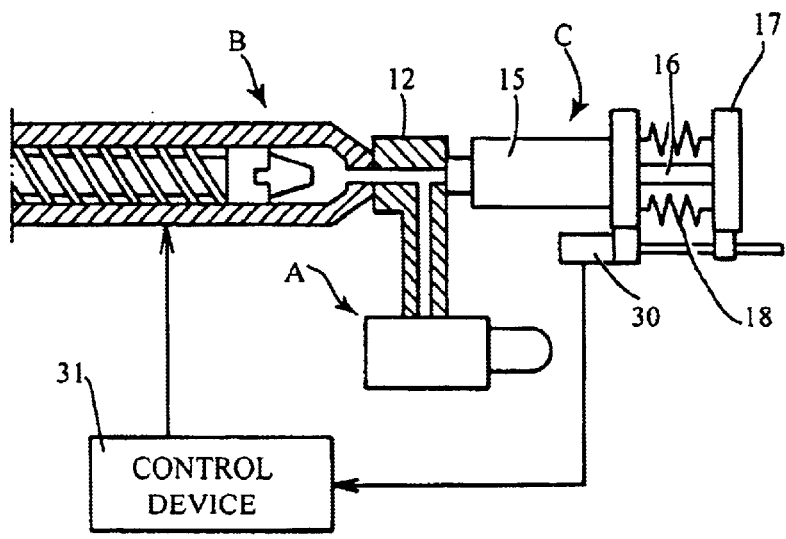
FIG. 3 is a schematic cross section of an injection molding machine according to a second embodiment of the present invention.

FIG. 3 shows an injection molding machine according to a second embodiment of the present invention. The same parts in the first and second embodiments are designated by the same reference numerals. The description of the parts will be omitted.

In this embodiment, a position-detecting sensor 30 for measuring the position variable of a plunger 16 is attached between the pot 15 of a buffering unit C and a flange 17. The position variable of the plunger 16 detected by the position detecting sensor 30 is fed to a controller 31 such as a computer or the like, where the amount of the resin reserved in the pot 15 is calculated. The plasticating unit B is controlled based on this resin amount, and thereby, the plastication resin amount is controlled so as not to exceed the upper limit of the amount of the resin capable of being reserved in the pot 15.

Figure 4:
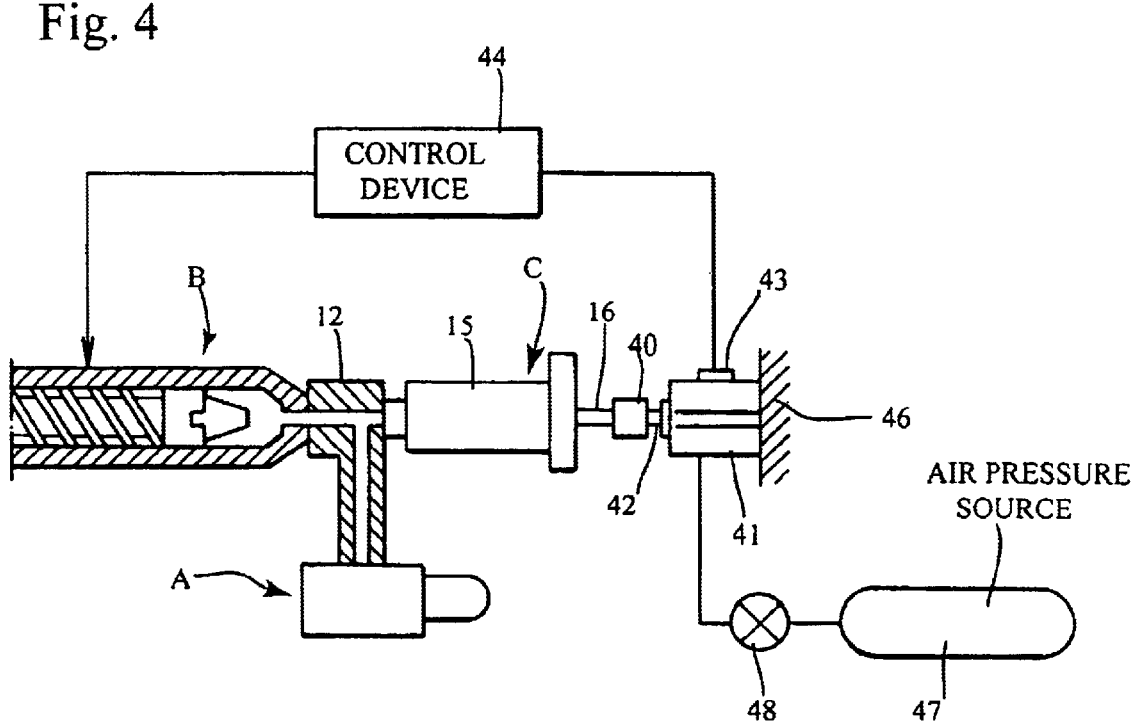
FIG. 4 is a schematic cross section of an injection molding machine according to a third embodiment of the present invention.

FIG. 4 shows an injection molding machine according to a third embodiment of the present invention. The same parts in the first and third embodiments are designated by the same reference numerals. The description of the parts will be omitted.

In this embodiment, a buffering unit C has the structure in which a plunger 16 is connected to the piston rod 42 of an air cylinder 41 through a joint 40 so that the resin pressure suffers substantially no changes when the volume of the resin reserved in the pot 15 is changed. The air cylinder 41 itself is fixed to the body 46 of the machine. Since a constant air pressure from a pneumatic source 47 is supplied to the air cylinder 41 through a regulator valve 48, the cylinder 41 is kept at a constant energizing force irrespective of the position of the plunger 16. That is, the pressure of the resin reserved in the buffering unit C can be stabilized irrespective of the change of the volume inside of the pot 15. Thus, the resin pressure in the reservoir 4 of the injecting unit A is stabilized. Accordingly, the density of the resin to be injected can be made constant, and also, dispersions in qualities of molding products can be reduced.

Further, a position detecting sensor 43 for measuring a displacement of the piston rod 42 is attached to the air cylinder 41. With this position detecting sensor 43, the position variable of the piston rod 42 is detected, and fed to a controller 44 such as a computer or the like. In the controller 44, the amount of the resin reserved in the pot 15 is calculated. The plasticating unit B is controlled, based on the calculated value, and thereby, the amount of the plasticated resin can be controlled so as not to exceed the upper limit of the amount of the resin capable of being reserved in the pot 15.

In the third embodiment, a constant air pressure is supplied to the cylinder 41. However, the air-pressure supplied to the cylinder 41 may be variable. In this case, since the extrusion pressure of the cylinder 41 can be desirably changed, the measuring process can be shortened, for example by feeding the resin from the cylinder 41 to the reservoir in the measuring process at a high speed.

Figure 5:
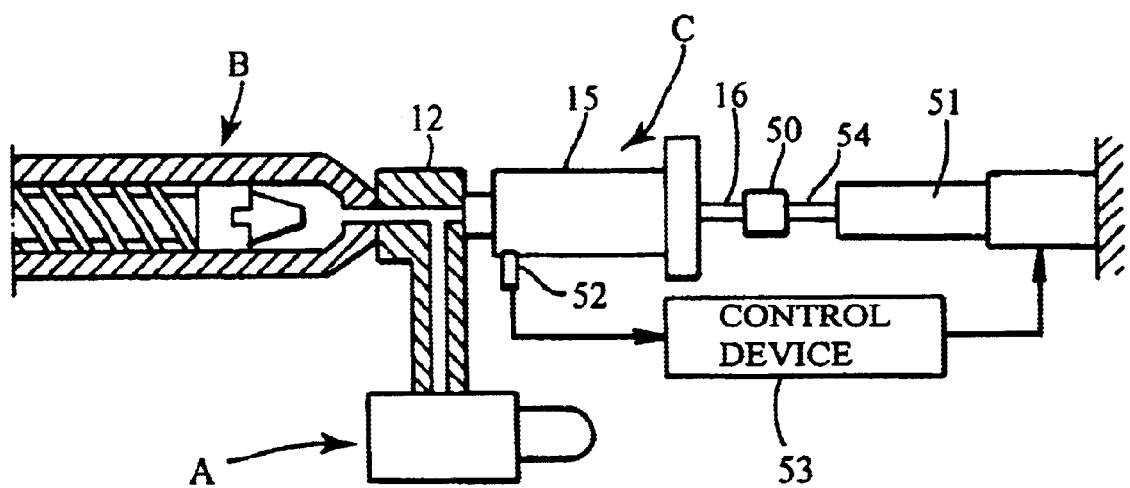
FIG. 5 is a schematic cross section of an injection molding machine according to a fourth embodiment of the present invention.

FIG. 5 shows an injection molding machine according to a fourth embodiment of the present invention. The same parts in the first and fourth embodiments are designated by the same reference numerals. The description of the parts will be omitted.

In this embodiment, the plunger 16 of a buffering unit C is connected to the rectilinear shaft 54 of a motor-type rectilinear actuator 51 through a joint 50. To the pot 15, a pressure sensor 52 for detecting a resin pressure therein is attached. A detection signal of the sensor 52 is transmitted to a controller 53. The controller 53 outputs a control signal to the rectilinear actuator 51.

In this case, the resin pressure in the pot 15 detected with the pressure sensor 52 is transmitted to the controller 53, which feedback-controls the rectilinear actuator 51 so that the pressure value becomes constant. Thus, the pressure of the resin reserved in the pot 15 can be stabilized at a high precision. Further, the measuring process can be shortened by operating the actuator 51 at a high speed when the melted resin is fed from the buffering unit C to an injecting unit A in the measuring process.

Figure 6:
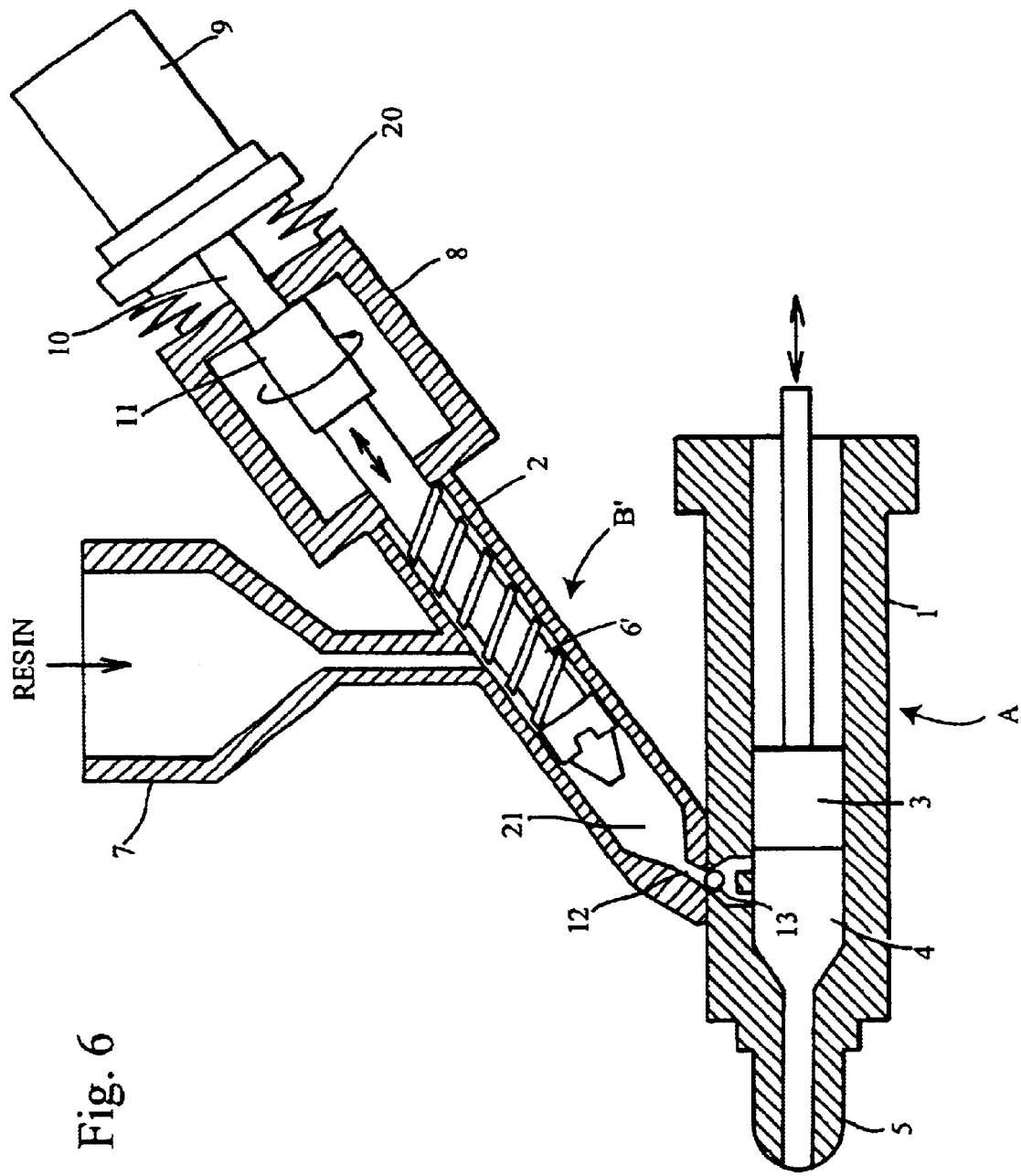
FIG. 6 is a schematic cross section of an injection molding machine according to a fifth embodiment of the present invention.

FIG. 6 shows an injection molding machine according to a fifth embodiment of the present invention.

In this embodiment, a buffering unit is contained in a plasticating unit B'. As to the plasticating unit B', disposed is a screw 6' rotatable and movable in the axial direction in a plasticating cylinder 2. The screw 6' and the rotary shaft 10 of a screw driving motor 9 are connected to each other through a joint 11. A sleeve 8 provided in the rear of the cylinder 2 and the body of the screw driving motor 9 are separated from each other. A spring 20 for energizing the motor 9 forward is interposed between the sleeve 8 and the body of the motor 9. That is, the screw 6' is energized forward (in the direction where a resin is extruded) with the spring 20. When the screw 6' is moved backward, a buffering chamber 21 is formed between the top of the screw 6' and the cylinder 2 in which a plasticated resin can be reserved in an amount at least equal to the injection amount per shot. FIG. 6 shows the state in which the screw 6' is moved backward.

Also in this embodiment, the motor 9 is continuously driven so that a resin supplied through the hopper 7 is continuously melted and plasticated. When the check valve 13 is in the closed state, the resin plasticated with the plasticating unit B' is reserved in the buffering chamber 21. With the amount of the reserved resin being increased, the screw 6' is moved backward. Then, the spring 20 is pulled to be elongated, so that the resin pressure in the buffering chamber 21 is gradually increased. When the plunger 3 of the plasticating unit A is moved backward for the measuring process, the check valve 13 is opened, and the melted resin in the buffering chamber 21 is fed into the reservoir 4 with the spring force of the spring 20 being applied.

In this case, the injection molding machine can be reduced in size, since the buffering unit is integrated with the plasticating unit B'. Moreover, the resin plasticated in the buffering chamber 21 is sequentially fed into the injecting unit A through the top of the buffering chamber 21, and the plasticated resin is not retained in the buffering chamber 21 for a long time. Accordingly, characteristically, the degradation of the resin is reduced.

Figure 7:
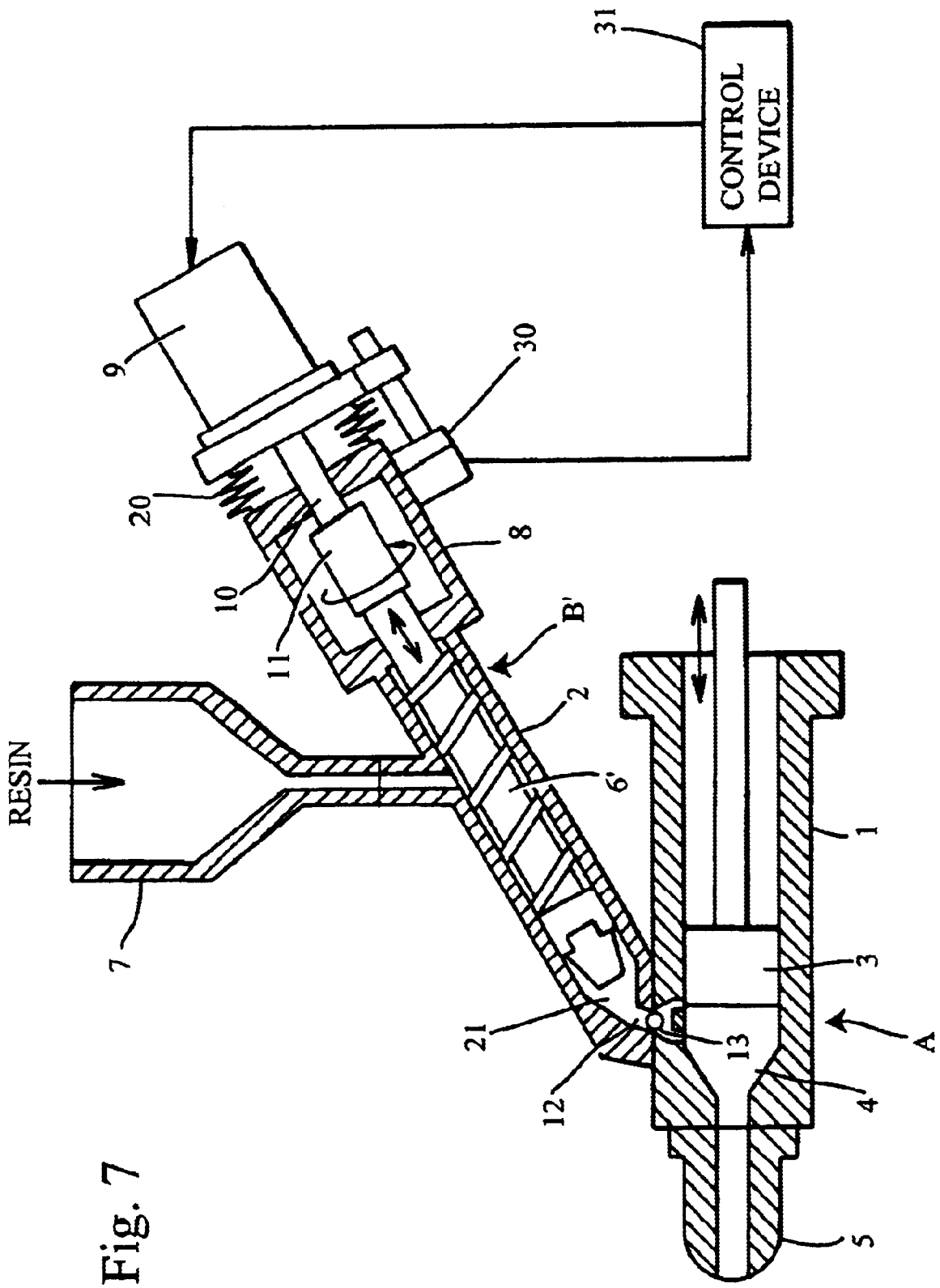
FIG. 7 is a schematic cross section of an injection molding machine according to a sixth embodiment of the present invention.

FIG. 7 shows an injection molding machine according to a sixth embodiment of the present invention.

In this embodiment, a position detecting sensor 30 is attached between the sleeve 8 and the screw driving motor 9 of the fifth embodiment (FIG. 6) to detect the change in position of a screw 6'. The detected position variable of the screw 6' is transmitted to a controller 31 such as a computer or the like, where the amount of the resin reserved in the buffering chamber 21 is calculated. By controlling the motor 9 based on the calculated resin amount, the amount of the plasticated resin is controlled so as not to exceed the upper limit of the amount of the resin capable of being reserved in a buffering chamber 21.

Figure 8:
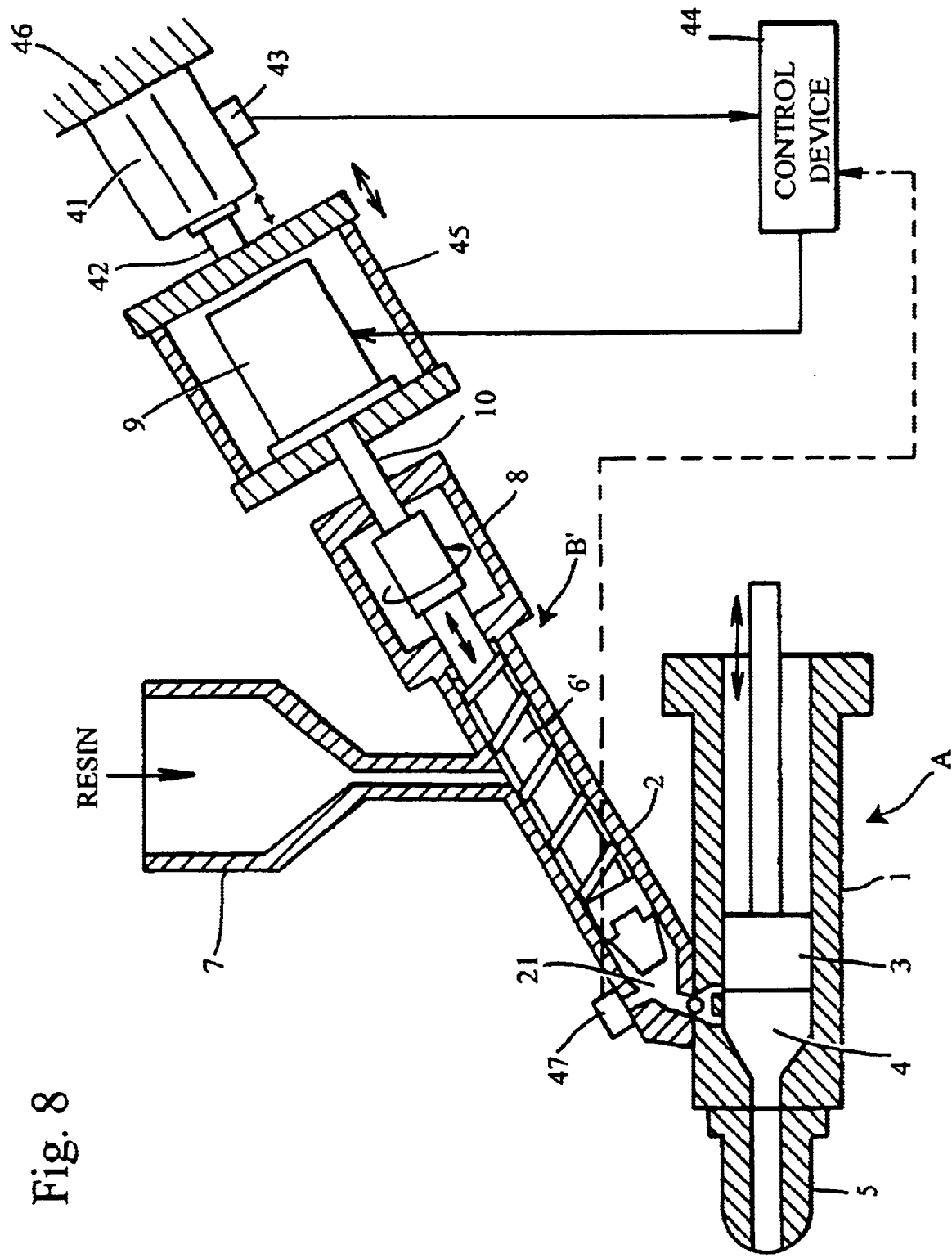
FIG. 8 is a schematic cross section of an injection molding machine according to a seventh embodiment of the present invention.

FIG. 8 shows an injection molding machine according to a seventh embodiment of the present invention. The same parts in the fifth and seventh embodiments are designated by the same reference numerals, and the description of the parts will be omitted.

In this embodiment, the structure illustrated in FIG. 4 is applied to the fifth embodiment. In particular, a screw driving motor 9 is held with a motor attaching frame 45. The attaching frame 45 is connected to the piston rod 42 of an air cylinder 41. The air cylinder 41 is fixed to the machine body 46. For this reason, by operation of the air cylinder 41, the screw 6' can be moved forward and backward through the motor attaching frame 45. Also in this case, by supplying a constant air pressure to the air cylinder 41, a constant pressure is applied to the buffering chamber 21, irrespective of the change in volume of the buffering chamber 21. Thus, the pressure of the reserved resin can be stabilized.

A position detecting sensor 43 for measuring the position variable of the piston rod 42 is attached to the air cylinder 41. With the position detecting sensor 43, the position variable of the piston rod 42 is detected and transmitted to a controller 44 such as a computer or the like. In the controller 44, the amount of the resin reserved in the buffering chamber 21 is calculated. By controlling the motor 9 based on the calculated value, the amount of the plasticated resin is controlled so as not to exceed the upper limit of the amount of the resin capable of being reserved in the buffering chamber 21.

When the air pressure to be supplied to the air cylinder 41 can be varied, a pressure sensor 47 for detecting a resin pressure in the buffering chamber 21 may be provided, and in this case, by inputting a detection signal of the pressure sensor 47 to the controller 44, the air cylinder 41 is feedback-controlled so that the resin pressure in the buffering chamber 21 has a predetermined value. Thus, the resin pressure in the buffering chamber 21 can be controlled at a high precision.

Figure 9:
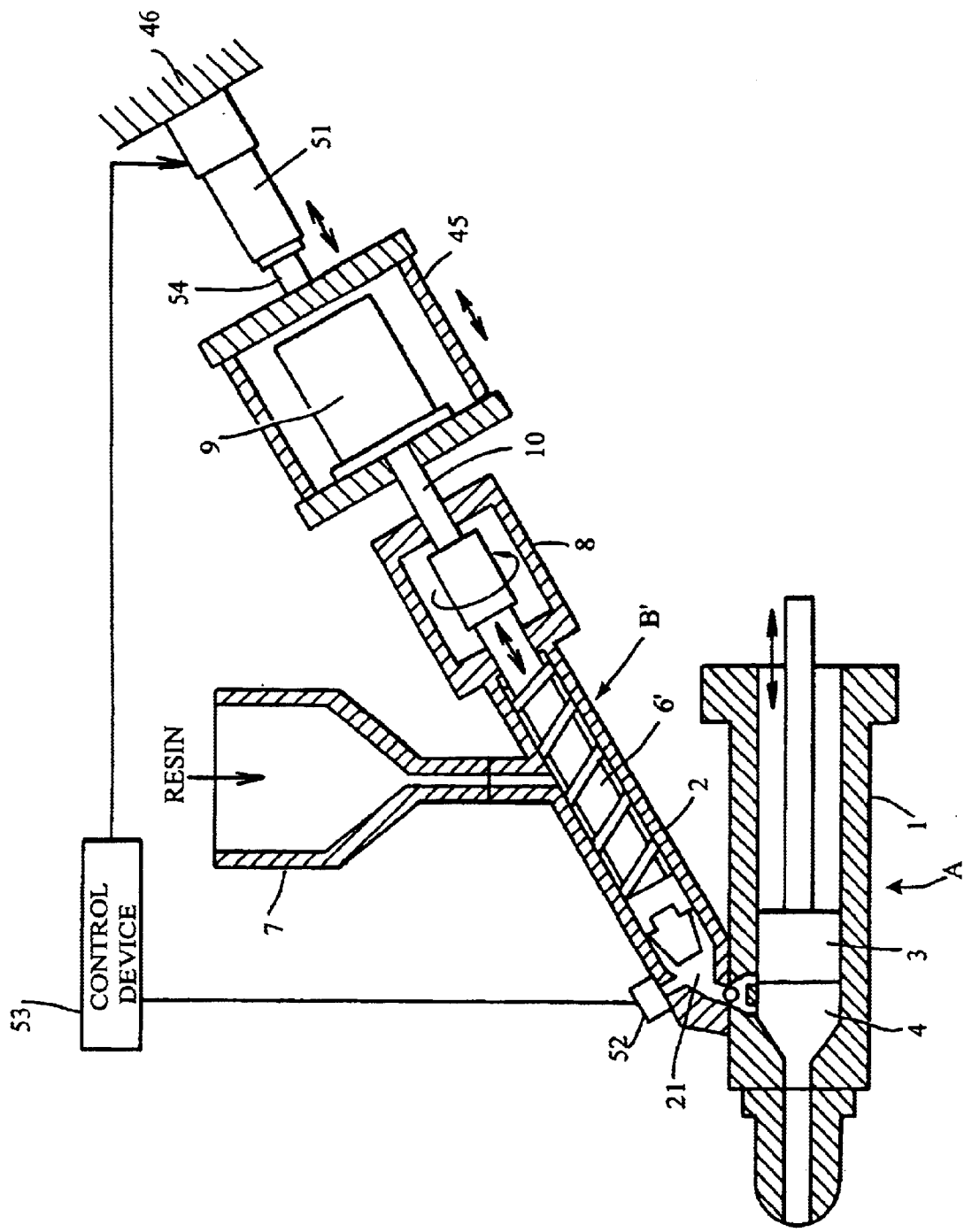
FIG. 9 is a schematic cross section of an injection molding machine according to an eighth embodiment of the present invention.

FIG. 9 shows an injection molding machine according to an eighth embodiment of the present invention. The same parts in the fifth and eighth embodiments are designated by the same reference numerals, and the description of the parts will be omitted.

In this embodiment, an electric rectilinear actuator 51 is used instead of the air cylinder 41 as shown in FIG. 8. The rectilinear shaft 54 of the rectilinear actuator 51 is connected to a motor attaching frame 45 with which a screw driving motor 9 is held. The actuator 51 itself is secured to the machine body 46. A pressure sensor 52 for detecting a resin pressure in a buffering chamber 21 is attached. A detection signal of the sensor 52 is transmitted to a controller 53. The controller 53 feedback-controls the rectilinear actuator 51 so that the resin pressure in the buffering chamber 21 is made constant.

Also in this case, the measuring process can be shortened by operating the actuator 51 at a high speed when the melted resin is fed from the buffering chamber 21 to an injecting unit A.

Figure 10:
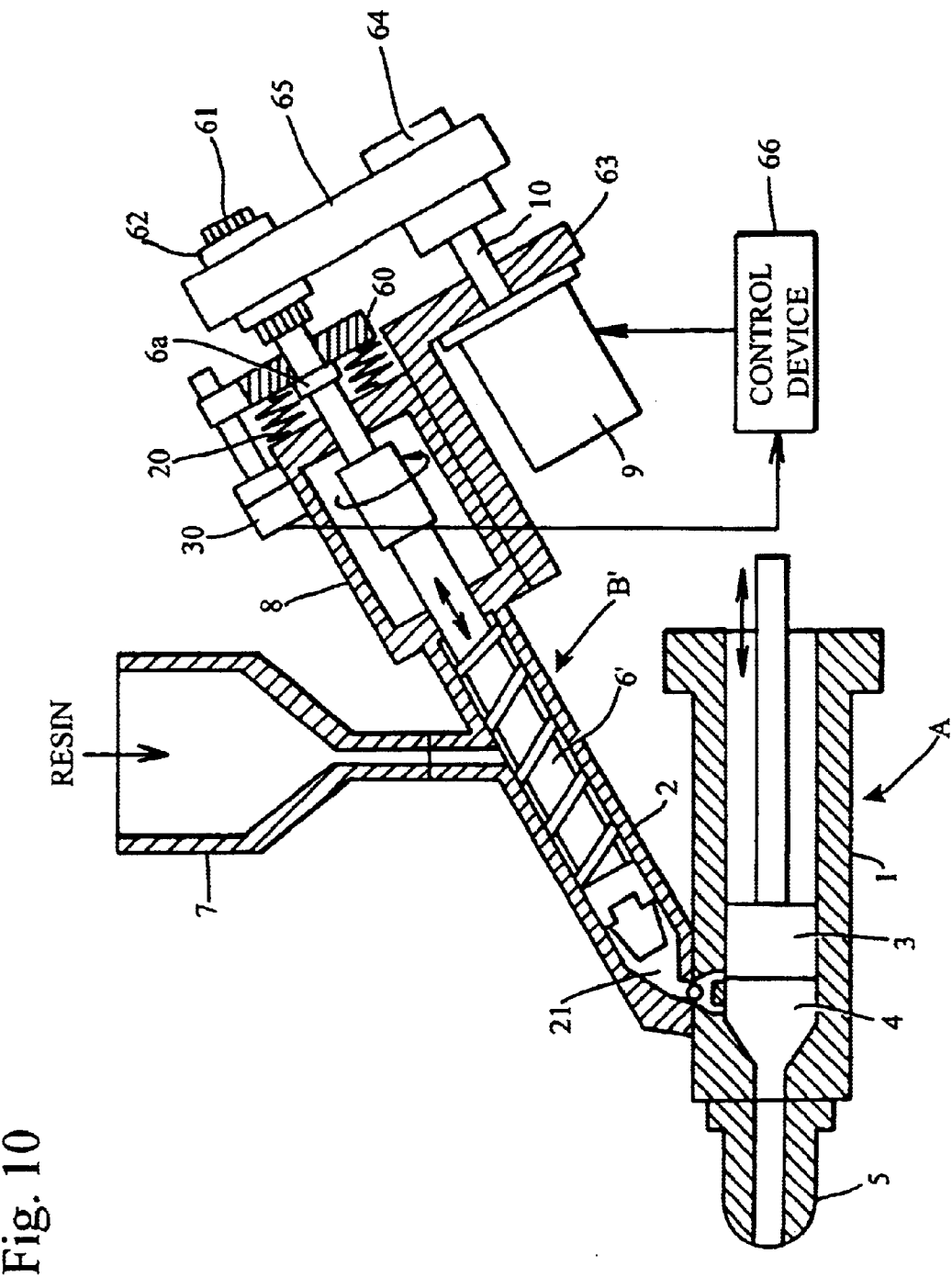
FIG. 10 is a schematic cross section of an injection molding machine according to a ninth embodiment of the present invention.

FIG. 10 shows an injection molding machine according to an eighth embodiment of the present invention.

In each of the embodiments of FIGS. 6 through 9, the rotary shaft 10 of the screw driving motor 9 is connected to the screw 6' so that they can be operated integrally with each other in the rotation and axial directions. On the other hand, as shown in FIG. 10, the screw 6' and the rotary shaft 10 of the motor 9 are separated from each other, so that only the rotational force from the rotary shaft 10 can be transmitted to the screw 6'.

A flange 6a is provided on the shaft portion of the screw 6'. A screw-pressing plate 60, which receives the spring force of a spring 20, is contacted with the flange 6a under pressure so that the screw 6' is energized in the resin extrusion direction. As means for energizing the screw 6' in the extrusion direction, a fluid-pressure cylinder 41 as shown in FIG. 7, and an electric actuator 51 as shown in FIG. 8 can be employed instead of the spring 20. The screw-pressing plate 60 can be relatively rotated with respect to the shaft portion of the screw 6'. A position detecting sensor 30 for detecting a displacement in the axial direction of the screw 6' is provided between the screw pressing plate 60 and the sleeve 8. A detection signal of the sensor 30 is transmitted to a controller 66. The controller 66 calculates the amount of the resin reserved in a buffering chamber 21, and based on the calculated value, the motor 9 is controlled, so that the amount of the reserved resin is prevented from exceeding the upper limit of the amount of the resin capable of being reserved in the buffering chamber 21.

A spline 61 is provided in the rear end of the shaft portion of the screw 6'. A driven pulley 62 is fitted to the spline 61 slidable in the axial direction and rotatable integrally with the spline 61. The motor 9 is secured to a sleeve 8 through a motor attaching plate 63. A driving pulley 64 is connected to the rotary shaft 10 of the motor 9. A transmission member 65 such as a belt, a chain, or the like is wrapped around the driving pulley 64 and the driven pulley 62 so as to be provided between them. Accordingly, when the motor 9 is driven, the screw 6' is rotationally driven through the transmission member 65. Further, when the screw 6' is moved in the axial direction, the spline 61 and the driven pulley 62 are slid in the axial direction, so that the axial movement of the screw 6' can be permitted.

In FIG. 10, as the transmission device for transmitting a rotational force of the motor 9 to the screw 6', a wrapping connector such as a belt, a chain, or the like is used. However, a gear or another means may be employed.

The present invention is not limited to the above-described embodiments. Needless to say, various modifications and variations are possible.

Figure 1:
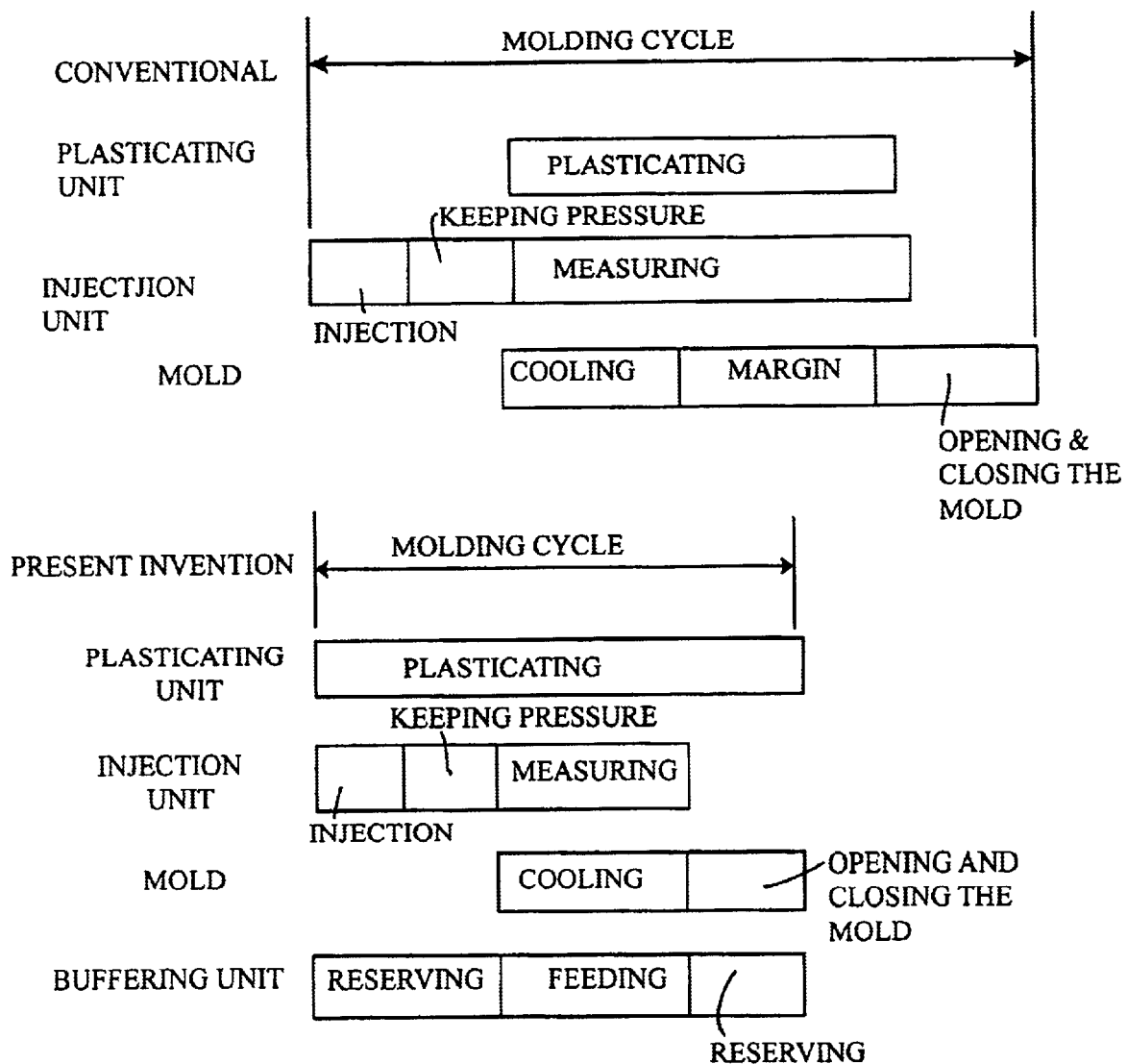
FIG. 1 is an illustration comparing a conventional molding cycle and that of the present invention.

In reference to FIG. 1, described is an example in which the plasticating unit B, B' is driven continuously during all the period of the molding cycle. However, the plasticating unit B, B' is not necessarily driven continuously. For example, for resins having relatively good screw-engaging properties, the plasticating unit B, B'
may be driven intermittently. In this case, since the plasticating unit B, B' can be driven independently of the injecting unit A and the mold, due to the buffering unit C, the plasticating unit B, B' can be operated in a desired mode.

In each of the first through ninth embodiments, described is the screw preplasticating injection molding machine. However, other types of injection molding machines (for example, a plunger preplasticating type or the like) are available on condition that each of them includes a plasticating unit and an injecting unit provided independently of each other.

As seen in the above-description, according to the first aspect of the present invention, in the connecting passage connecting the plasticating and injecting units to each other, provided is the buffering unit for reserving a resin in an amount at least equal to the quantity of the resin capable of being injected per shot. Accordingly, the plasticating unit can be continuously driven during all the molding cycle, in contrast to a conventional plasticating unit which is driven intermittently. Accordingly, even a resin having low engaging properties can be rendered a high plastication efficiency, and thereby, the time of the molding cycle can be shortened.

According to the second aspect of the present invention, the buffering unit is contained in the plasticating unit. Accordingly, in addition to the advantages of the injection molding machine according to the first aspect of the present invention, the buffering unit can be integrated with the plasticating unit, and thereby, the injection molding machine can be reduced in size. Further, advantageously, the degradation of the resin is inhibited, since the plasticated resin is fed to the injecting unit sequentially without being retained in the buffering chamber.

What is claimed is:

1. A thermoplastic resin injection molding machine comprising:
a plasticating unit for plasticating a thermoplastic resin,
an injecting unit connected to the plasticating unit through a connecting passage to inject the plasticated resin into a mold,
a buffering unit having a buffering chamber having a volume at least equal to the injection quantity of the resin per shot, said buffering unit receiving the resin plasticated in the plasticating unit during an injection by the injection unit, and said buffering unit feeding a measured amount of the resin held in the buffering chamber into the injecting unit after injection by the injection unit, the buffering chamber provided in said plasticating unit, and
a pressure sensor detecting a pressure in said buffering chamber wherein resin pressure is controlled to be constant in the buffering chamber based upon detected pressure.

2. A thermoplastic resin injection molding machine as claimed in claim 1, in which said buffering unit is contained in said plasticating unit, and further comprising a plunger disposed to be moved forward and backward, and means for energizing the plunger in the resin extrusion direction.

3. A thermoplastic resin injecting molding machine as claimed in claim 2, in which the energizing means comprises a spring.

4. A thermoplastic resin injection molding machine as claimed in claim 2, in which the energizing means comprises a fluid-pressure cylinder.

5. A thermoplastic resin injection molding machine as claimed in claim 2, in which the energizing means comprises an electric actuator.

6. A thermoplastic resin injection molding machine as claimed in claim 4, in which a constant fluid pressure from a fluid pressure source is transmitted to the fluid-pressure cylinder.

7. A thermoplastic resin injection molding machine comprising:
- a plasticating unit for plasticating a thermoplastic resin,
- an injecting unit connected to the plasticating unit through a connecting passage to inject the plasticated resin into a mold,
- a buffering unit having a buffering chamber and receiving the resin plasticated in the plasticating unit, wherein the buffering unit is contained in the plasticating unit and is located in a longitudinal direction of the plasticating unit,
- a screw contained in the plasticating unit,
- a position detecting sensor detecting a change in position of the screw, and
- a controller calculating an amount of the resin in the buffering chamber based on the position of the screw and controlling the screw.

8. A thermoplastic resin injection molding machine as claimed in claim 7, wherein the buffering unit receiving the resin plasticated in the plasticating unit during an injection by the injection unit.

9. A thermoplastic resin injection molding machine as claimed in claim 7, wherein the screw is disposed to be moved forward and backward, and means for energizing the screw in the resin extrusion direction.

10. A thermoplastic resin injection molding machine as claimed in claim 9, in which the energizing means comprises a spring.

11. A thermoplastic resin injection molding machine as claimed in claim 9, in which the energizing means comprises a fluid-pressure cylinder.

12. A thermoplastic resin injection molding machine as claimed in claim 9, in which the energizing means comprises an electric actuator.

13. A thermoplastic resin injection molding machine as claimed in claim 7, wherein said screw provided in said plasticating unit is a reciprocating screw, said position detecting sensor detecting the position of said reciprocating screw to control an amount of resin input to the buffering unit and further comprising a pressure sensor detecting a pressure in said buffering unit.

14. A thermoplastic resin injection molding machine as claimed in claim 7, further comprising a pressure detecting sensor detecting a pressure in said buffering unit.

15. A thermoplastic resin injection molding machine as claimed in claim 14, wherein the screw is disposed to be moved forward and backward, and means for energizing the screw in the resin extrusion direction.

16. A thermoplastic resin injection molding machine as claimed in claim 9, further comprising a screw driving motor for rotating the screw, wherein the screw and rotary shaft of the screw driving motor are separated from each other.

17. A thermoplastic resin injection molding machine as claimed in claim 15, in which the energizing means comprises a spring.

18. A thermoplastic resin injection molding machine as claimed in claim 15, in which the energizing means comprises a fluid-pressure cylinder.

19. A thermoplastic resin injection molding machine as claimed in claim 15, in which the energizing means comprises an electric actuator.

* * * * *